US008063931B2

(12) United States Patent
Saishu et al.

(10) Patent No.: US 8,063,931 B2
(45) Date of Patent: Nov. 22, 2011

(54) STEREOSCOPIC DISPLAY APPARATUS

(75) Inventors: Tatsuo Saishu, Tokyo (JP); Rieko Fukushima, Tokyo (JP); Kazuki Taira, Tokyo (JP); Yuzo Hirayama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1250 days.

(21) Appl. No.: 11/785,869

(22) Filed: Apr. 20, 2007

(65) Prior Publication Data
US 2008/0079662 A1   Apr. 3, 2008

(30) Foreign Application Priority Data

Oct. 3, 2006   (JP) ................................. 2006-272090

(51) Int. Cl.
*H04N 13/04* (2006.01)
*H04N 15/00* (2006.01)
(52) U.S. Cl. ................. 348/51; 348/42; 348/53; 348/54; 348/55; 348/58; 348/60; 345/55
(58) Field of Classification Search .................... 348/42, 348/51–60; 345/55
See application file for complete search history.

(56) References Cited

U.S. PATENT DOCUMENTS

| | | | | |
|---|---|---|---|---|
| 6,064,424 A * | 5/2000 | van Berkel et al. | ............. | 348/51 |
| 6,118,584 A * | 9/2000 | Van Berkel et al. | ........... | 359/463 |
| 6,603,504 B1 * | 8/2003 | Son et al. | ......................... | 348/54 |
| 6,741,031 B2 * | 5/2004 | Harada et al. | .................. | 313/582 |
| 6,801,243 B1 | 10/2004 | Van Berkel | | |
| 7,317,494 B2 * | 1/2008 | Mashitani et al. | ............. | 348/739 |
| 2002/0085156 A1 * | 7/2002 | Lee | ................................ | 349/141 |
| 2004/0004677 A1 * | 1/2004 | Hasegawa et al. | .............. | 349/42 |
| 2004/0252374 A1 | 12/2004 | Saishu et al. | | |
| 2005/0083246 A1 * | 4/2005 | Saishu et al. | .................... | 345/1.1 |
| 2005/0099689 A1 | 5/2005 | Fukushima et al. | | |
| 2005/0264651 A1 * | 12/2005 | Saishu et al. | .................... | 348/51 |
| 2006/0170616 A1 | 8/2006 | Hirayama et al. | | |
| 2008/0191966 A1 * | 8/2008 | Van Berkel | ..................... | 345/32 |

FOREIGN PATENT DOCUMENTS

| | | |
|---|---|---|
| JP | 10-505689 | 6/1998 |
| JP | 3027506 | 1/2000 |
| JP | 3525995 | 2/2004 |
| JP | 2005-86414 | 3/2005 |

OTHER PUBLICATIONS

Saishu, T., "53.3: Distortion Control in a One-Dimensional Integral Imaging Autostereoscopic Display system with Parallel Optical Beam Groups," SID 04 Digest, pp. 1438-1441, (2004).

* cited by examiner

*Primary Examiner* — Jay Patel
*Assistant Examiner* — Jessica Prince
(74) *Attorney, Agent, or Firm* — Finnegan, Henderson, Farabow, Garrett & Dunner, L.L.P.

(57) ABSTRACT

A stereoscopic display apparatus includes a display having pixels arrayed in a longitudinal direction and a lateral direction to form a matrix, each pixel including sub-pixels with color components, and a control element opposed to the display and having linear openings extending in the longitudinal direction and arrayed in the lateral direction. The openings of any two sub-pixels adjacent in the lateral direction always overlap regardless of a position in the lateral direction. The sum of the longitudinal components of the opening ratios of s adjacent in the lateral direction is constant.

8 Claims, 12 Drawing Sheets

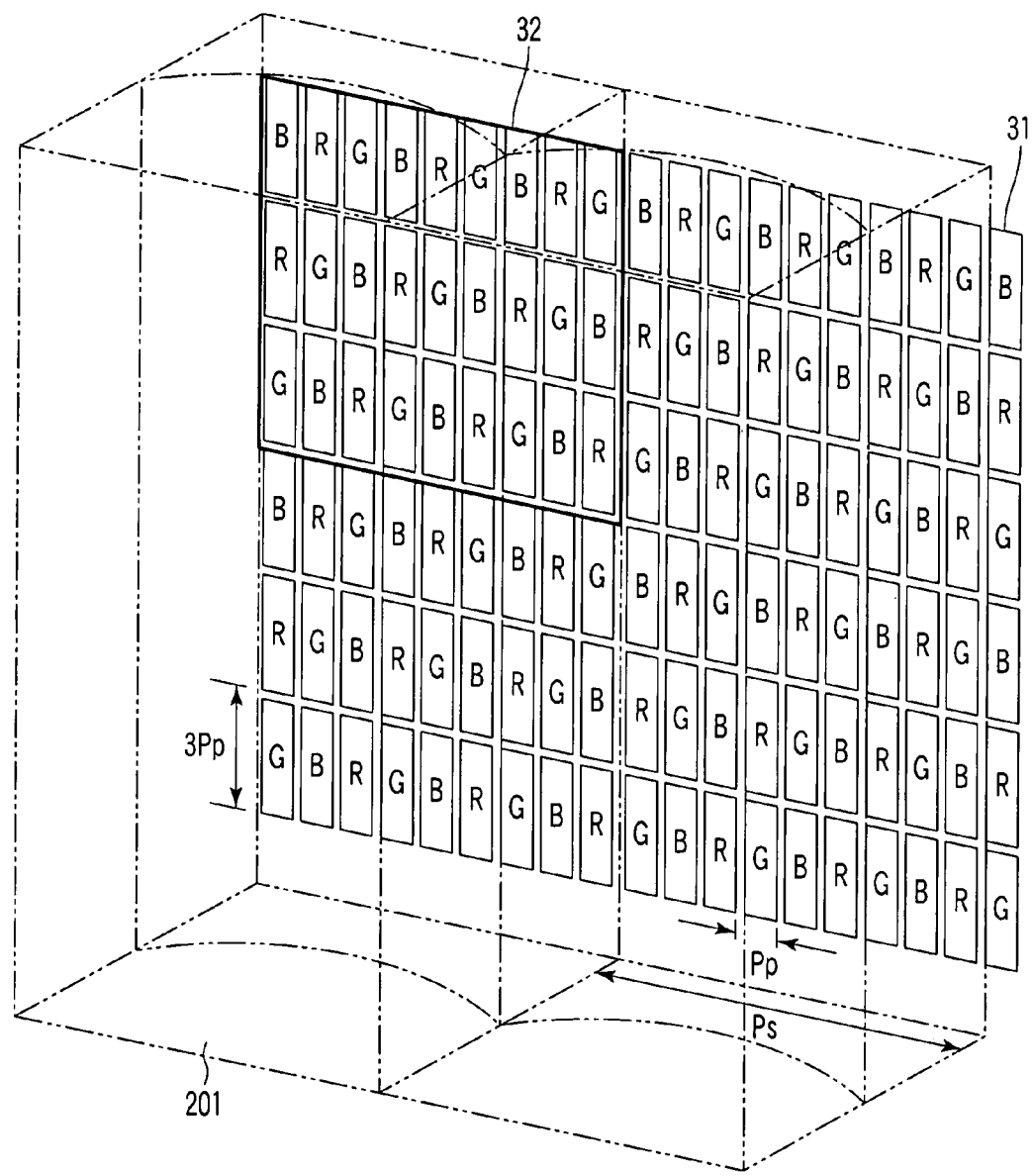
F I G. 13

STEREOSCOPIC DISPLAY APPARATUS

CROSS-REFERENCE TO RELATED APPLICATIONS

This application is based upon and claims the benefit of priority from prior Japanese Patent Application No. 2006-272090, filed Oct. 3, 2006, the entire contents of which are incorporated herein by reference.

BACKGROUND OF THE INVENTION

1. Field of the Invention

The present invention relates to a stereoscopic display apparatus.

2. Description of the Related Art

A stereoscopic image display apparatus capable of displaying a motion image, i.e., a so-called 3D display, is available in a variety of schemes. Particularly, in recent years, a demand increases for a scheme of a flat panel type that does not require exclusive eyeglasses. Among stereoscopic motion image display apparatuses of this type, a scheme that utilizes the principle of hologram is difficult to display a full color motion image. Another scheme in which a beam control element controlling a beam from the display panel and directing the beam toward the observer is set immediately in front of a pixel position-fixed display panel (display device) such as a direct viewing type or projection type liquid crystal display apparatus, or a plasma display apparatus allows to display a full color motion image comparatively easily.

Generally, the beam control element is also called a parallax barrier, and controls the beam so that different images can be seen depending on the angle even at one position of the beam control element. More specifically, when providing only right-and-left parallax (horizontal parallax), a slit or a lenticular sheet (cylindrical lens array) is used. When including top-and-bottom parallax (vertical parallax) as well, a pinhole array or a lens array is used. Schemes that employ a parallax barrier are further classified into a binocular scheme, a multi-view scheme, a super-multi-view scheme (the super-multi-view conditions for the multi-view scheme), and integral photography (to be also referred to as IP hereinafter). These basic principles are almost identical to those invented about 100 years ago and have been employed in stereoscopic photography.

Among these schemes, the characteristic feature of the IP scheme resides in that it provides high degrees of freedom for the viewpoint position and enables stereoscopic vision easily. The 1D IP scheme that includes only horizontal parallax and does not include vertical parallax can implement a high-resolution display apparatus comparatively easily, as is described in SID04 Digest 1438 (2004). In contrast to this, with the binocular scheme or the multi-view scheme, the range of the viewpoint position where stereoscopic vision is possible, i.e., the viewing area, is narrow, and the observer cannot see the image well. However, the binocular scheme or the multi-view scheme has the simplest arrangement as the stereoscopic image display apparatus, and can generate a display image readily.

In a direct viewing type autostereoscopic display apparatus using such a slit or a lenticular sheet, the periodic structure of the openings of the beam control element interferes with that of the pixels of the flat panel display apparatus to generate moiré or color moiré easily. As a countermeasure for this, a method of obliquely inclining the extending directions of the openings of the beam control element, i.e., a slanted lens, is known. This method, however, displays longitudinal lines in a zigzag manner when displaying a stereoscopic image to particularly result in poor character display quality. A vertical lens in which the extending directions of the openings of the beam control element are not inclined has no problem in the character display quality. To solve the color moiré, however, the color arrangement of the elemental image display must comprise a mosaic array or a lateral stripe array. To solve the moiré, the beam from an adjacent sub-pixel must be fused appropriately by, e.g., a method of adding a diffusion film between the elemental image display and the lenticular lens (JP-A 2005-86414 (KOKAI)). Addition of the diffusion film, however, scatters the external light to decrease the brightness contrast. Known methods of appropriately fusing the beam from the adjacent sub-pixel in the case of the vertical lens include a method of arraying sub-pixels to form a delta array (Japanese Patent No. 3027506), a method of forming parallelogrammic sub-pixel openings so that adjacent pixels overlap (PCT(WO) 10-505689), and a method of making the sum of the opening ratios of the sub-pixels in the longitudinal direction to a constant value (Japanese Patent No. 3525995). However, not only to solve the moiré but also to achieve continuous motion parallax as in the 1D IP scheme, with the conventional methods, the fusion of the beam from the sub-pixel is insufficient.

As described above, in the conventional stereoscopic display apparatus in which the beam control element is set vertically, moiré that interferes with display tends to occur readily to make it difficult to obtain continuous motion parallax.

BRIEF SUMMARY OF THE INVENTION

A stereoscopic display apparatus according to the present invention has a display including pixels arrayed in a longitudinal direction and a lateral direction to form a matrix, each pixel comprising sub-pixels with color components, and a control element opposed to the display and including linear openings extending in the longitudinal direction and arrayed in the lateral direction. The openings of any two sub-pixels adjacent in the lateral direction always overlap regardless of a position in the lateral direction, and the sum of longitudinal components of opening ratios of sub-pixels adjacent in the lateral direction is constant.

BRIEF DESCRIPTION OF THE SEVERAL VIEWS OF THE DRAWING

FIG. 13 is a partial enlarged perspective view of the apparatus in FIG. 9.

DETAILED DESCRIPTION OF THE INVENTION

Figure 1:
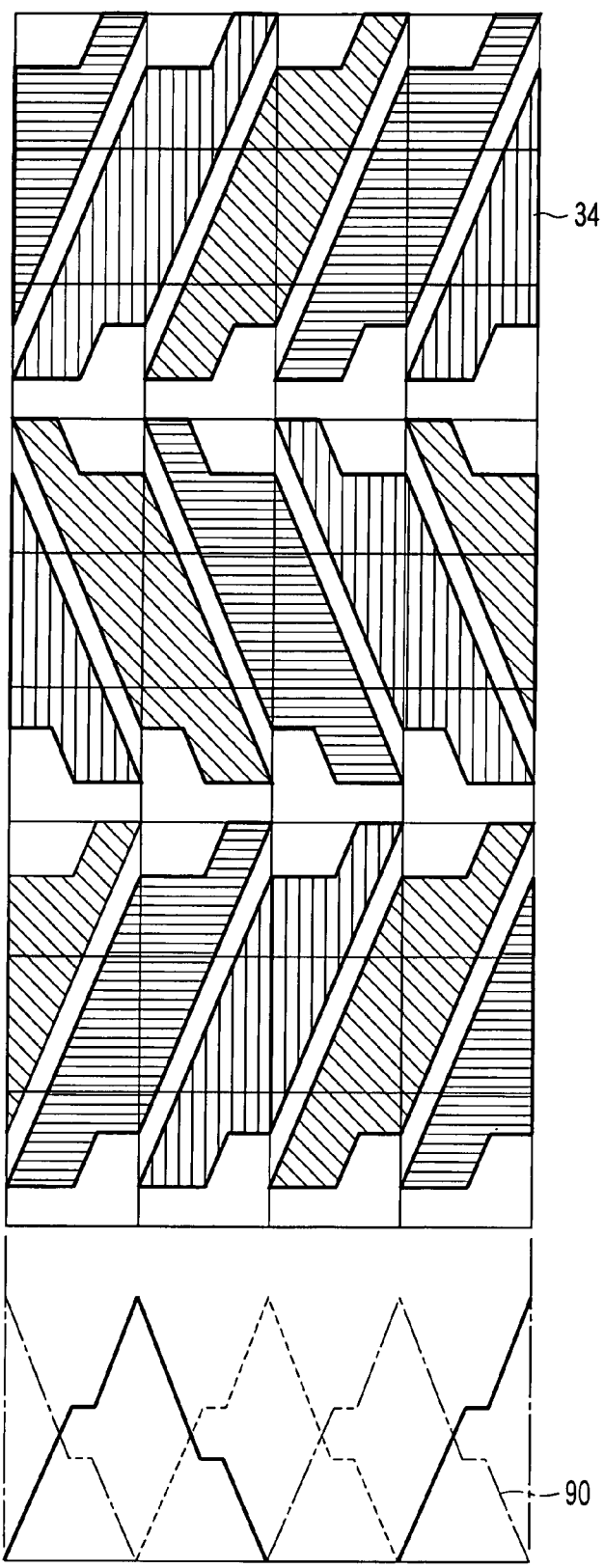
FIG. 1 shows the opening shape and the color arrangement of 3 rows×4 columns of sub-pixels of an elemental image display in a stereoscopic display apparatus according to an embodiment.

Referring to FIG. 1, squares are drawn as auxiliary lines, shaded portions indicate openings 34 (identical types of shaded portions indicate identical color components) of sub-pixels, and a plain white portion indicates a light-shield (black matrix). In the opening shape and the color arrangement of the sub-pixels in FIG. 1, light-shielding portions corresponding to longitudinal wiring lines (signal wiring lines) extend in a zigzag fashion in the column direction bending for every row. The light-shielding portions completely traverse the width (one square drawn as the auxiliary line) corresponding to the lateral period of sub-pixels in each row. According to this opening shape, openings 34 of any two sub-pixels adjacent in the lateral direction always overlap regardless of a position in the lateral direction. Furthermore, as shown in the lower portion of FIG. 1, the sum of longitudinal components 90 of the opening ratios (vertical opening ratios) of sub-pixels adjacent in the lateral direction is constant regardless of a position in the lateral direction. To satisfy these two conditions, when the aspect ratio of the sub-pixel shape satisfies lateral:longitudinal=1:N, the longitudinal wiring line between the two sub-pixel openings adjacent in the right-and-left direction must be an almost straight line that forms an angle $\theta$ with the vertical direction that satisfies $\theta > \text{atan}(1/N)$. In FIG. 1, N=3. Also, to satisfy the above conditions, each vertex of each sub-pixel opening 34 must be located on the same vertical line as a vertex of a sub-pixel opening 34 that is adjacent in the right-and-left direction. Also, each endmost vertex of each sub-pixel opening 34 must be located on the same vertical line as an endmost vertex of a sub-pixel opening 34 that is apart by one sub-pixel in the right-and-left direction. The color arrangement forms a mosaic array. With this structure, the beam from the adjacent sub-pixel fuses appropriately. No moiré or color moiré occurs, and the continuity of the motion parallax increases.

Figure 2:
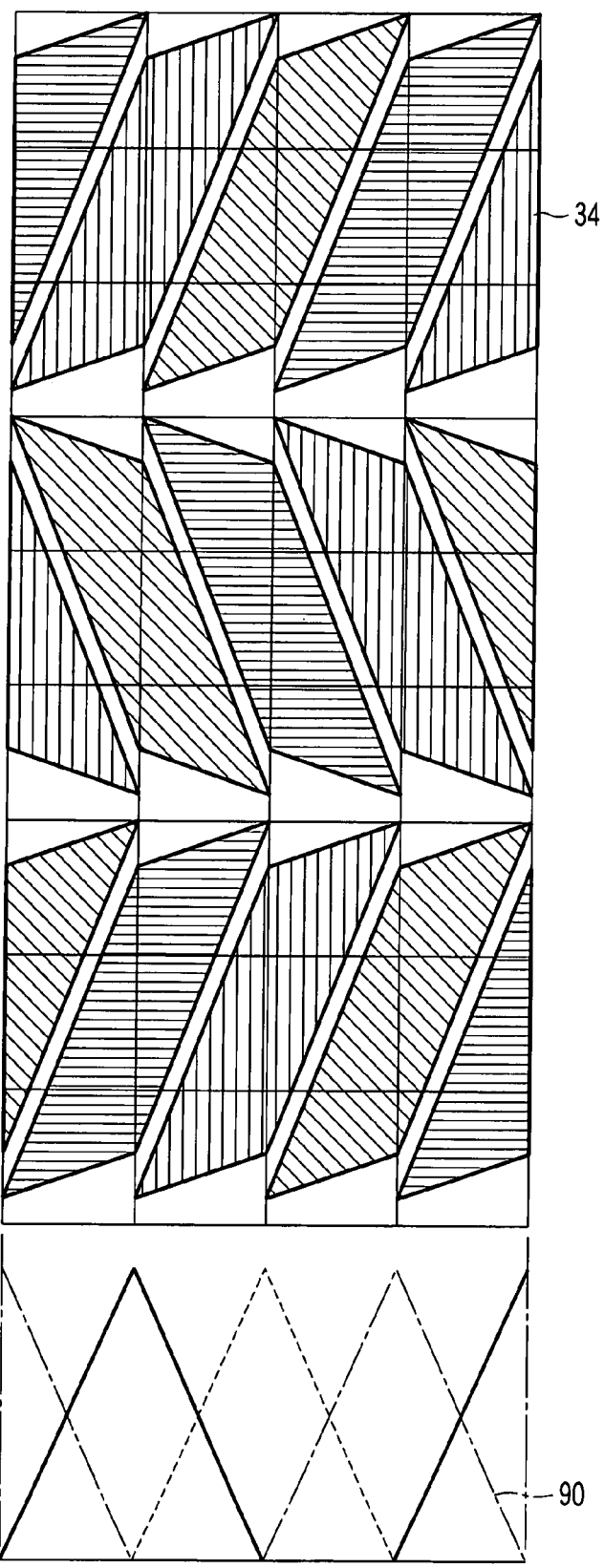
FIG. 2 shows the opening shape and the color arrangement of 3 rows×4 columns of sub-pixels of an elemental image display in a stereoscopic display apparatus according to another embodiment.

In the opening shape and the color arrangement of the sub-pixels in FIG. 2, a longitudinal component 90 of the opening ratio of each sub-pixel increases or decreases in value monotonically with respect to the position in the lateral direction. To increase the continuity of the motion parallax, this arrangement is more suitable than that in FIG. 1. However, restrictions imposed on the design of the shapes of sub-pixel openings 34 slightly increase.

Figure 3:
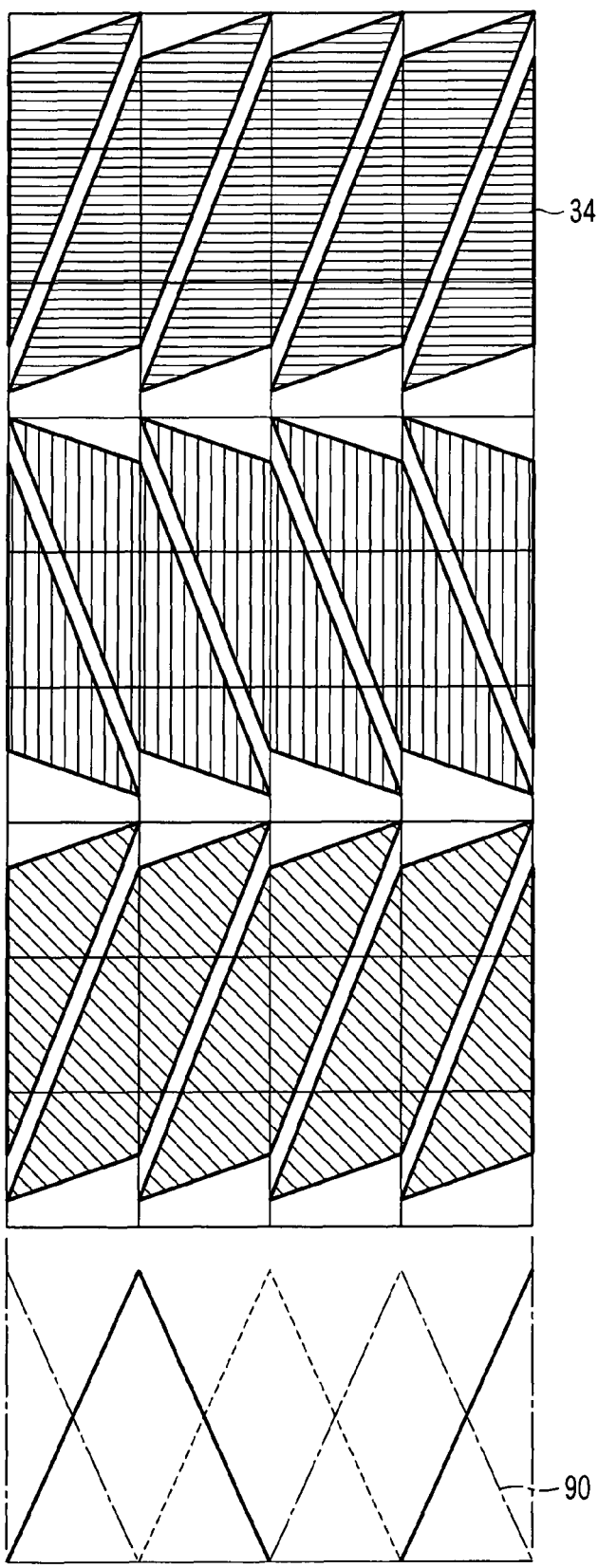
FIG. 3 shows the opening shape and the color arrangement of 3 rows×4 columns of sub-pixels of an elemental image display in a stereoscopic display apparatus according to still another embodiment.

The opening shape and the color arrangement of the sub-pixels in FIG. 3 are different from those in FIG. 2 only in that the color arrangement is a lateral stripe color arrangement. Even if the color arrangement is a lateral stripe color arrangement, the stereoscopic display performance is not different from that of the mosaic array. If, however, invalidating the beam control element by, e.g., removing it, and using only the element pixel display as an ordinary flat panel image display apparatus, the mosaic array can provide higher-resolution display.

Figure 4:
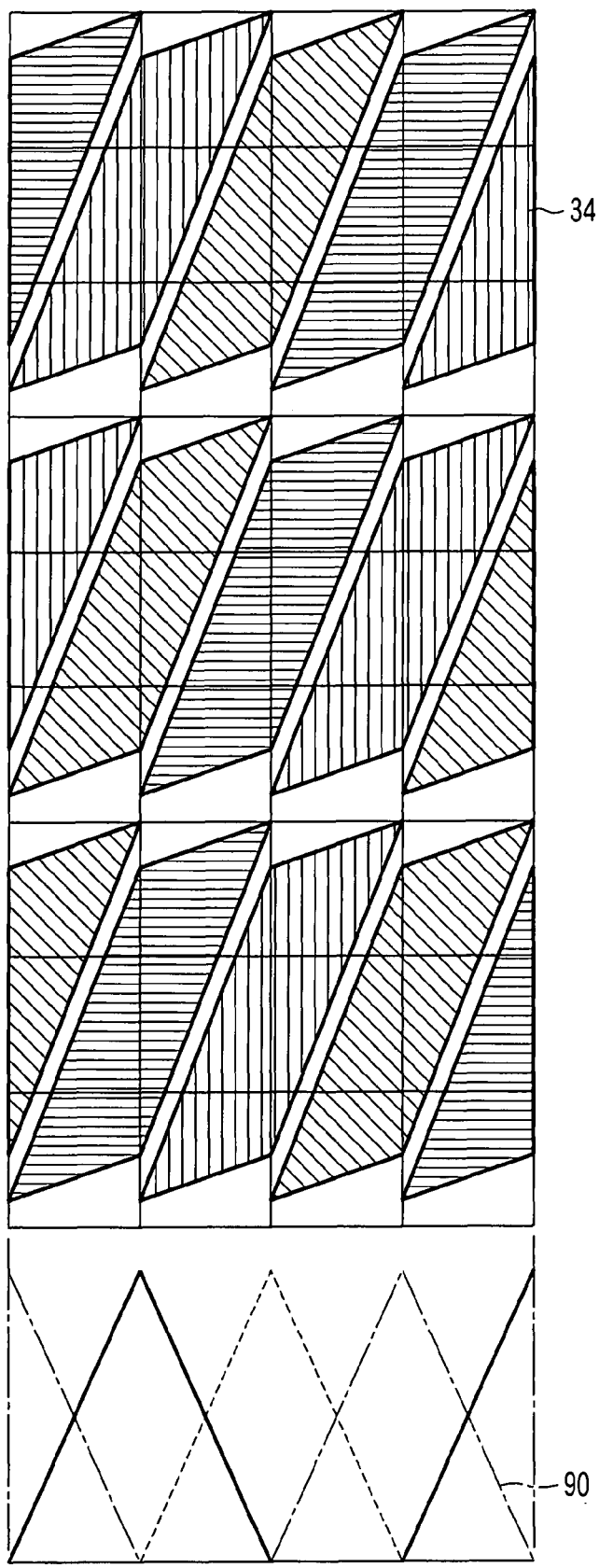
FIG. 4 shows the opening shape and the color arrangement of 3 rows×4 columns of sub-pixels of an elemental image display in a stereoscopic display apparatus according to still another embodiment.

The opening shape and the color arrangement of the sub-pixels in FIG. 4 are different from those in FIG. 2 only in that light-shielding portions corresponding to longitudinal wiring lines (signal wiring lines) does not extend in a zigzag fashion in the column direction bending for every row. This structure provides the same stereoscopic display performance as that in FIG. 2. However, the longitudinal wiring lines extend in a sawtooth fashion to increase the detour distance. This imposes restrictions on the design of the TFT array structure, which includes consideration for signal delay caused by the wiring line resistance. Therefore, the light-shielding portions preferably extend in a zigzag fashion.

Figure 5:
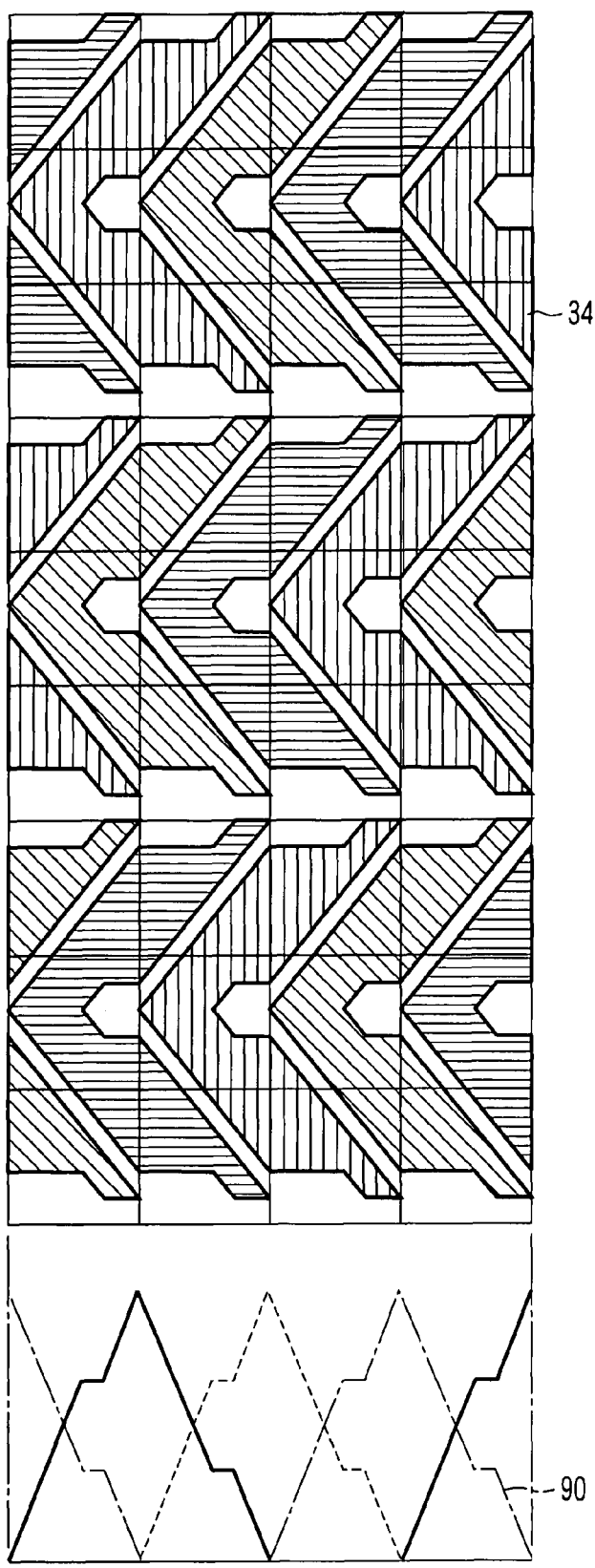
FIG. 5 shows the opening shape and the color arrangement of 3 rows×4 columns of sub-pixels of an elemental image display in a stereoscopic display apparatus according to still another embodiment.

In the opening shape and the color arrangement of the sub-pixels in FIG. 5, light-shielding portions corresponding to longitudinal wiring lines (signal wiring lines) extend in a zigzag fashion in the column direction. FIG. 5 is different from FIG. 1 only in that the light-shielding portions extend in a zigzag fashion within each row. Among general liquid crystal displays (LCDs), the IPS (FFS) type or MVA (PVA) type liquid crystal displays (LCD) employ this V-shaped sub-pixel opening shape. According to this opening shape, openings 34 of any two sub-pixels adjacent in the lateral direction always overlap regardless of a position in the lateral direction, and the sum of longitudinal components 90 of the opening ratios (vertical opening ratios) of sub-pixels adjacent in the lateral direction is constant regardless of a position in the lateral direction. This V-shaped structure can be regarded as a shape obtained by reducing two rows of the structure of each of FIGS. 1 to 4 into half in the longitudinal direction, and has the same advantage as that of FIGS. 1 to 4. To generalize this more, a multibent structure obtained by reducing M rows into 1/M in the longitudinal direction also has the same advantage. In the generalized case, when the aspect ratio of the sub-pixel shape satisfies lateral:longitudinal=1:N, each longitudinal wiring line between the sub-pixel openings adjacent in the right-and-left direction must be formed of M almost straight lines continued in a zigzag manner each of which forms an angle $\theta$ with the vertical direction that satisfies $\theta > \text{atan}(M/N)$. Although FIG. 5 shows a mosaic color arrangement, a lateral stripe array may be employed instead.

Figure 6:
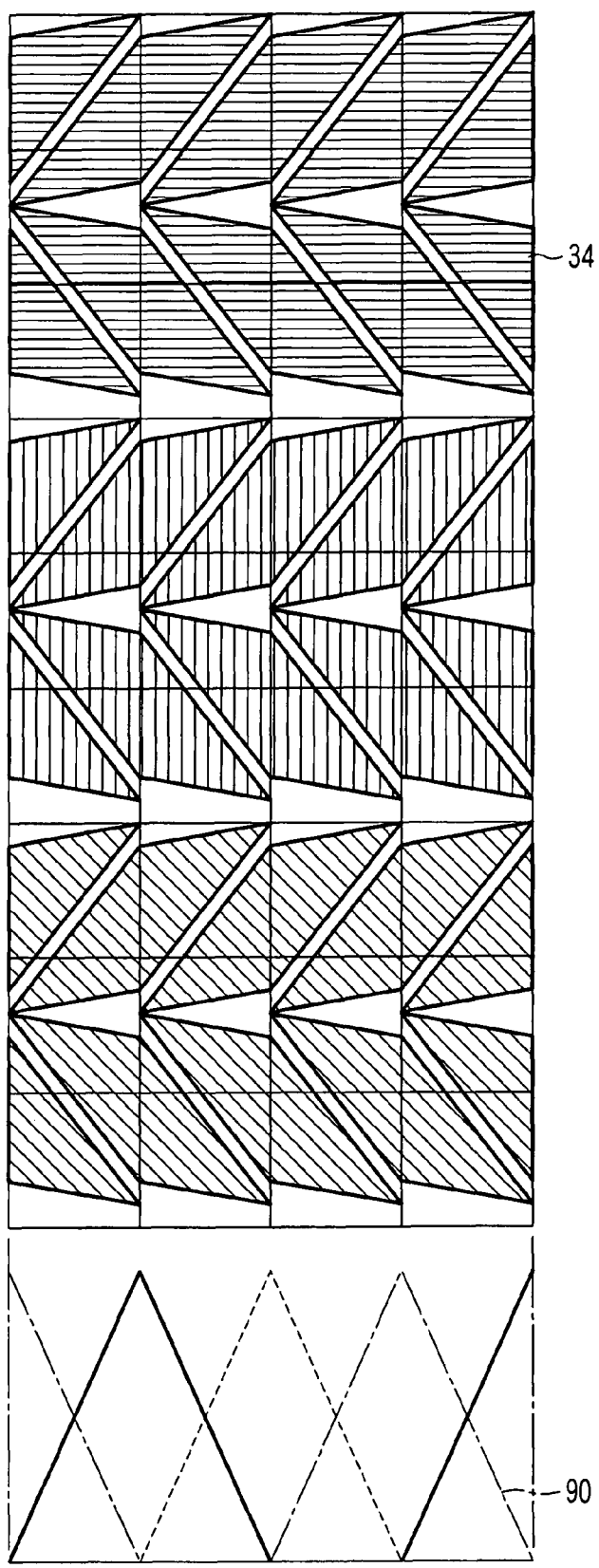
FIG. 6 shows the opening shape and the color arrangement of 3 rows×4 columns of sub-pixels of an elemental image display in a stereoscopic display apparatus according to still another embodiment.

In the opening shape and the color arrangement of the sub-pixels in FIG. 6, a light-shielding portion corresponding to a longitudinal wiring line (signal wiring line) forms a zigzag shape in the column direction, in the same manner as in FIG. 5, but within one row. A longitudinal component 90 of the opening ratio of each sub-pixel increases or decreases monotonically with respect to the position in the lateral direction in the same manner as in FIG. 3. The V-shaped sub-pixel opening shape is separated at the central portion. The pixel electrode (transparent electrode) may not be separated but continue. Although FIG. 5 shows a lateral stripe color arrangement, a mosaic color arrangement may be employed instead.

Figure 7:
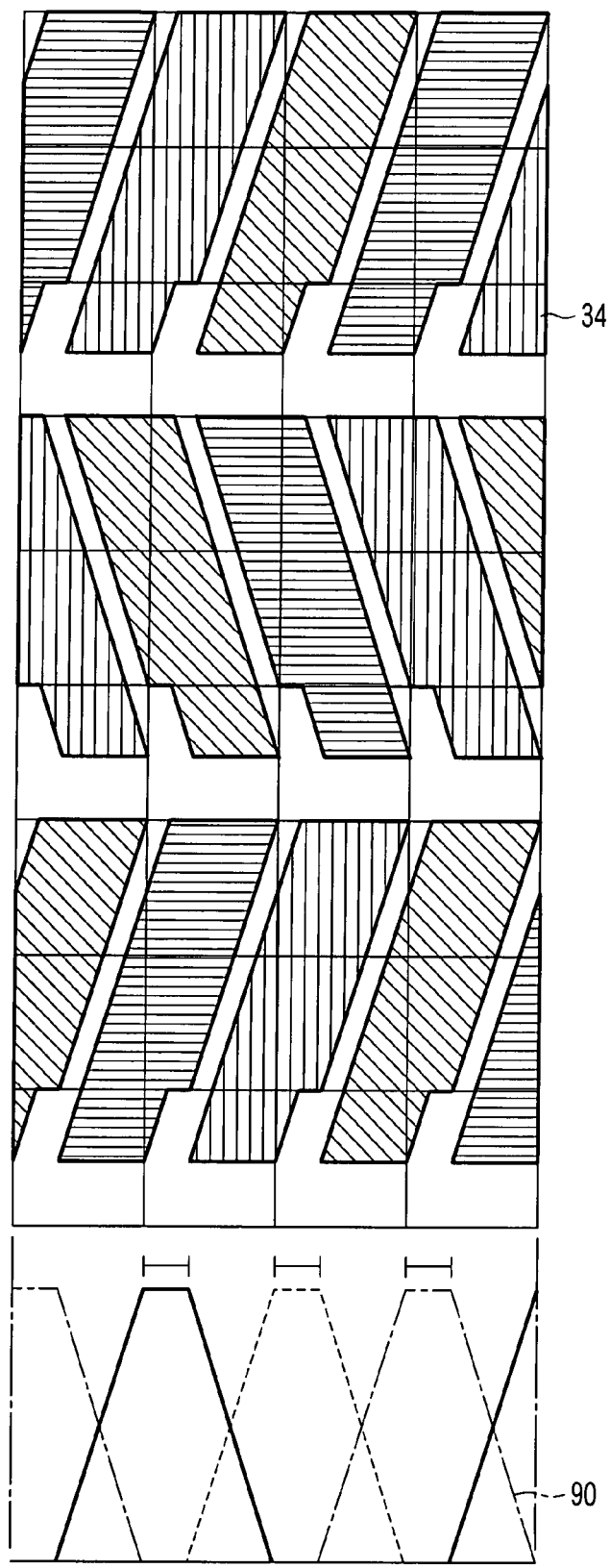
FIG. 7 shows the opening shape and the color arrangement of 3 rows×4 columns of sub-pixels of an elemental image display in a stereoscopic display apparatus according to a comparative example.

In the opening shape and the color arrangement of the sub-pixels in FIG. 7, light-shielding portions corresponding to longitudinal wiring lines (signal wiring lines) extend in a zigzag fashion in the column direction bending for every row.

The light-shielding portions do not completely traverse the width (one square drawn as an auxiliary line) corresponding to the lateral period of the sub-pixels in each row. Openings 34 of two sub-pixels adjacent in the lateral direction overlap merely partially. More specifically, when the aspect ratio of the sub-pixel shape satisfies lateral:longitudinal=1:N, the longitudinal wiring line between the two sub-pixel openings adjacent in the right-and-left direction is an almost straight line that forms an angle θ with the vertical direction that do not satisfies θ>atan (1/N). Although the sum of longitudinal components 90 of the opening ratios of sub-pixels adjacent in the lateral direction is constant regardless of a position in the lateral direction, a portion is left where the openings 34 of the sub-pixels do not overlap. Although this opening shape eliminates moiré almost completely, a beam from an adjacent sub-pixel fuses incompletely. Particularly, e.g., when the parallax number is small, the motion parallax has insufficient continuity.

Figure 8:
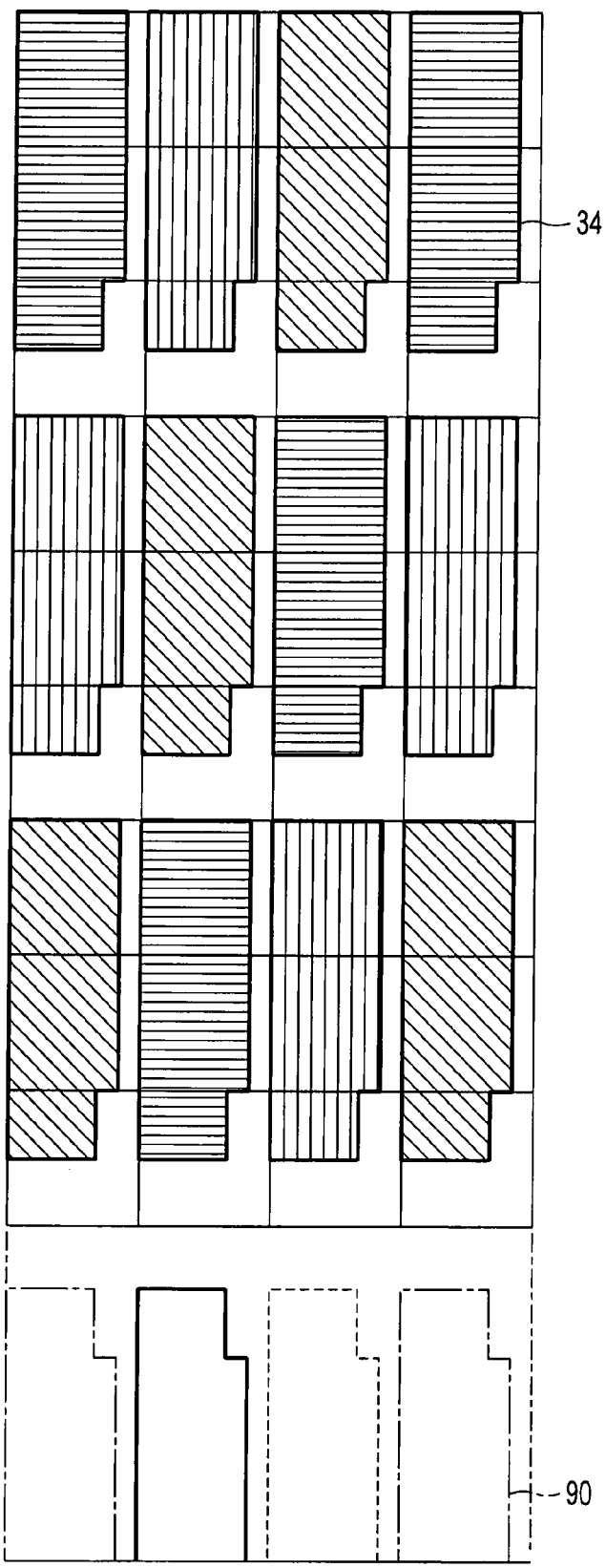
FIG. 8 shows the opening shape and the color arrangement of 3 rows×4 columns of sub-pixels of an elemental image display in a stereoscopic display apparatus according to another comparative example.

In the opening shape and the color arrangement of the sub-pixels in FIG. 8, light-shielding portions corresponding to longitudinal wiring lines (signal wiring lines) do not extend in a zigzag fashion in the column direction bending for every row but is linear. Openings 34 of sub-pixels adjacent in the lateral direction do not overlap at all. The sum of longitudinal components 90 of the opening ratios of sub-pixels adjacent in the lateral direction is not constant regardless of a position in the lateral direction. This will cause moiré. To fuse the beam from an adjacent sub-pixel, a diffusion film may be added. In this case, however, the diffusion film also scatters external light. This decreases the brightness contrast to degrade the display image quality.

Stereoscopic image display according to the 1D IP scheme or the multi-view scheme will be described with reference to FIGS. 9 to 13.

Figure 9:
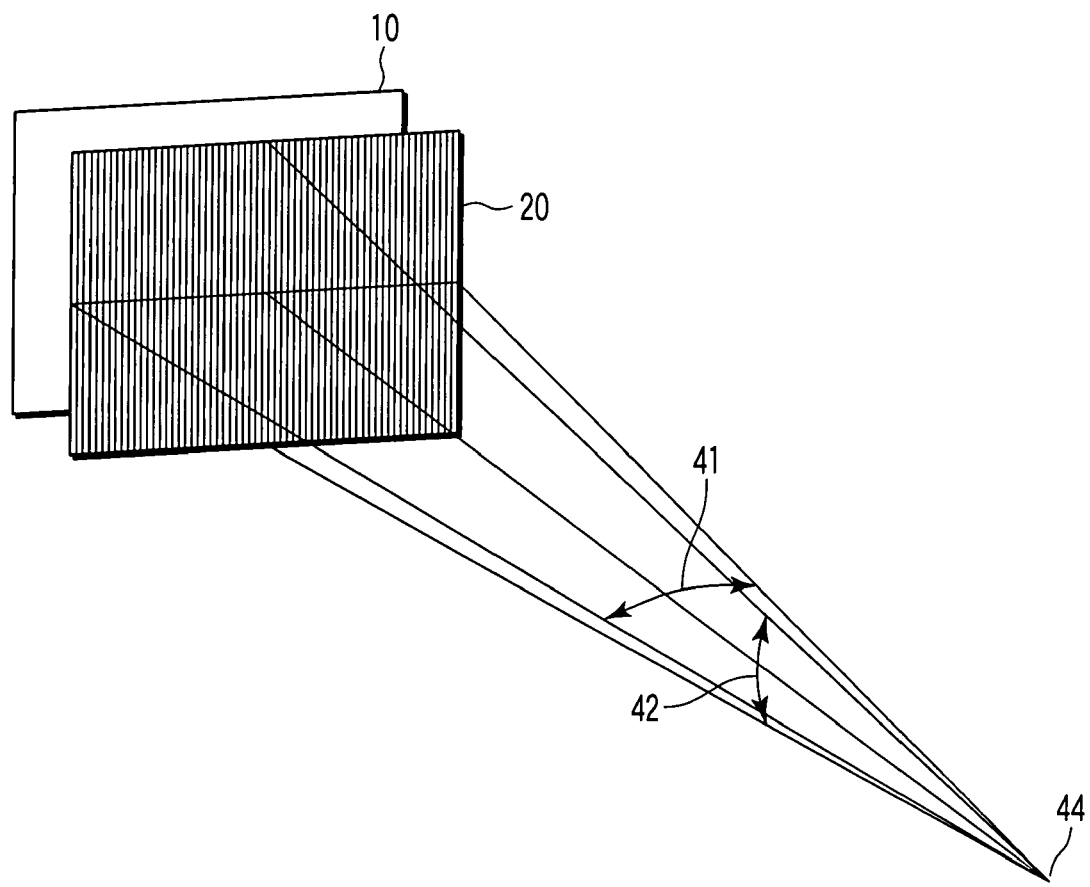
FIG. 9 is a perspective view of a stereoscopic display apparatus that employs an embodiment.
Figure 10:
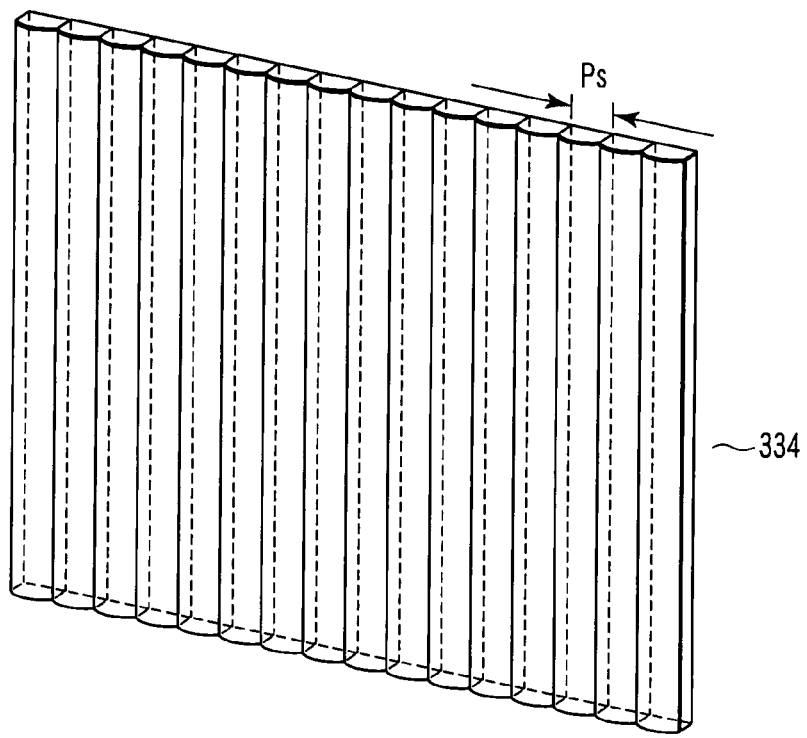
FIG. 10 is a perspective view of a lenticular sheet employed in the apparatus in FIG. 9.
Figure 11:
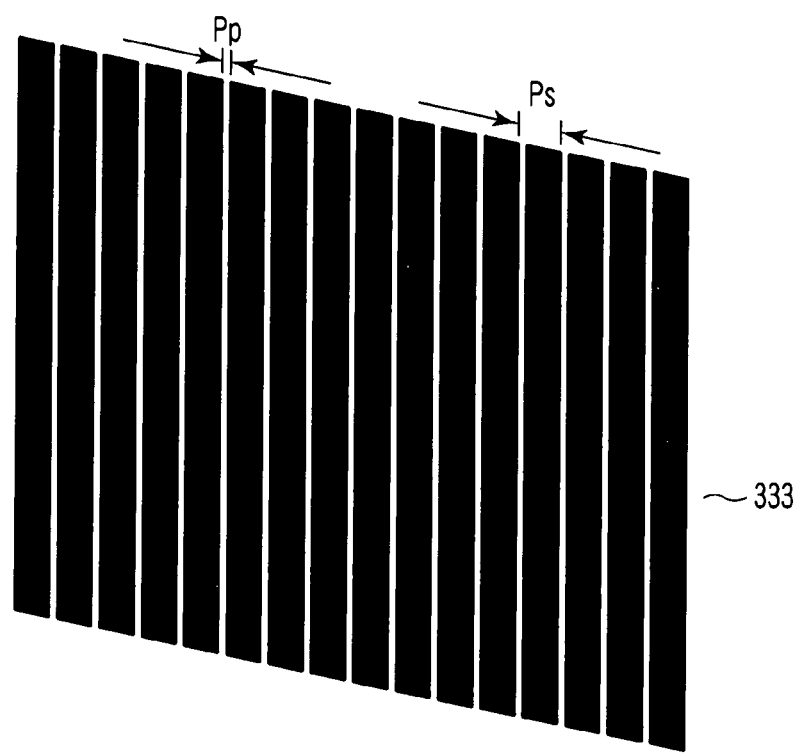
FIG. 11 is a perspective view of a slit array employed in the apparatus in FIG. 9.

As shown in FIG. 9, a stereoscopic display apparatus comprises an elemental image display 10 including pixels arrayed in the longitudinal direction and the lateral direction to form a matrix, each pixel comprising sub-pixels with color components, and a beam control element 20 opposed to the elemental image display 10. The elemental image display 10 is a high-resolution liquid crystal panel module having the sub-pixel opening shape and the color arrangement shown in FIGS. 1 to 6. The elemental image display 10 may be a plasma display panel, an organic EL display panel, a field emission type display panel, or the like, and may be of any type as far as its sub-pixel opening shape and the color arrangement satisfy the conditions described above. The beam control element 20 includes linear openings extending in the longitudinal direction and arrayed in the lateral direction. For example, the beam control element 20 may be a lenticular sheet 334 as shown in FIG. 10, or a slit array 333 as shown in FIG. 11. In the case of the 1D IP scheme, a horizontal pitch Ps of the beam control element 20 coincides with an integer multiple of the pitch in the row direction of the sub-pixels of the elemental image display 10. In the case of the multi-view scheme, the horizontal pitch Ps is slightly smaller (by about 0.5%) than an integer multiple of the pitch in the row direction of the sub-pixels of the elemental image display 10. In this stereoscopic display apparatus, the observer at an assumed position 44 can observe a stereoscopic image in the vicinities of the front surface and the rear surface of the beam control element 20 within the ranges of a horizontal visual angle 41 and a vertical visual angle 42.

Figure 12:
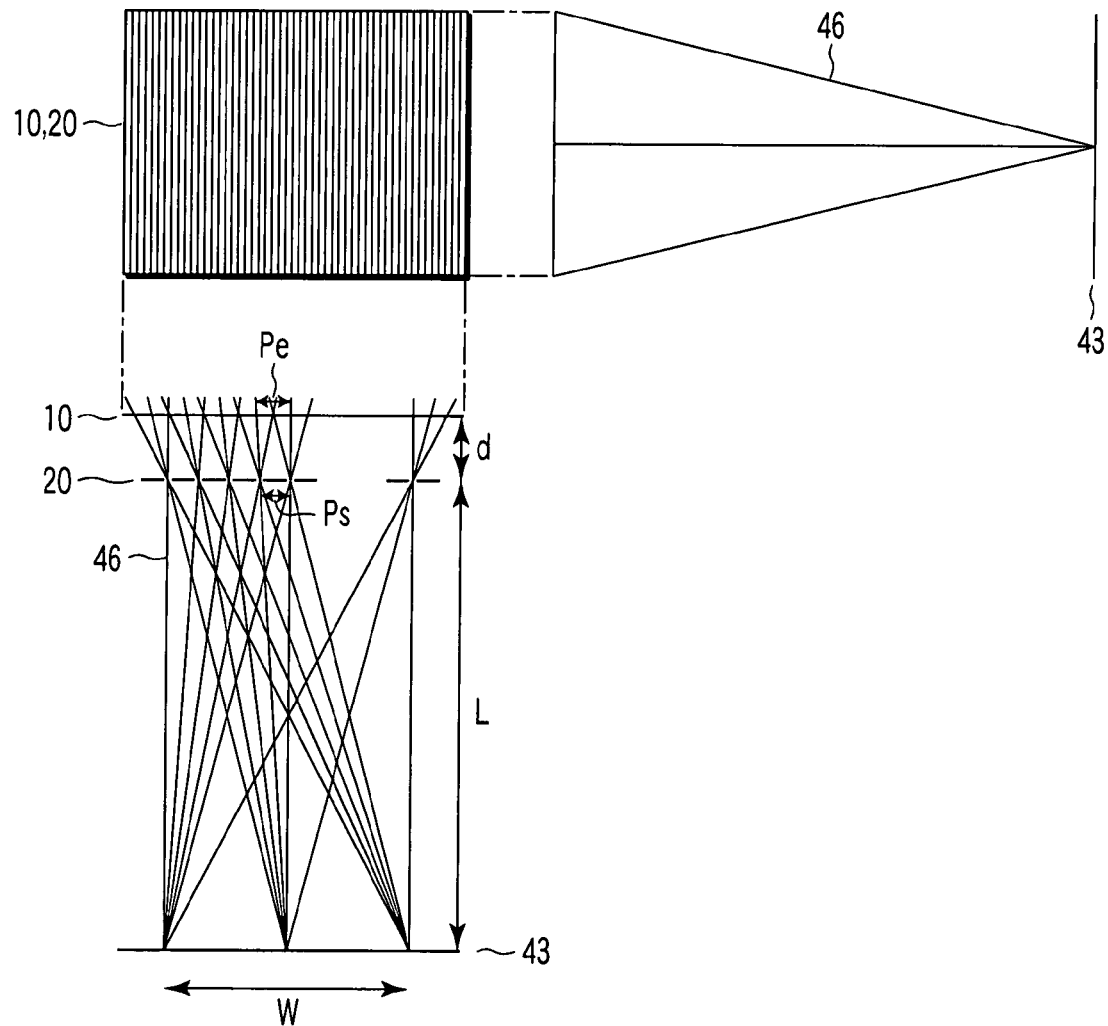
FIG. 12 shows the apparatus in FIG. 9 in development.

Referring to FIG. 12, when a viewing distance L between the beam control element 20 and a viewing plane 43, the beam control element horizontal pitch Ps, and a gap d between the beam control element and the pixel plane are specified, the intervals at which the centers of the apertures (or the lens principal points) are projected onto the elemental image display plane (sub-pixel plane) from the viewpoint on the viewing plane 43 determines an elemental image horizontal pitch Pe. Reference numeral 46 denotes the line that connects the viewpoint position and the respective aperture centers (lens principal points). The condition that the elemental images do not overlap on the sub-pixel plane determines a viewing area width W. In the case of the 1D IP scheme under the condition of having sets of parallel beams, the average value of the horizontal pitches of the elemental images is slightly larger than an integer multiple of the sub-pixel horizontal pitch, and the horizontal pitch of the beam control element is equal to the integer multiple of the sub-pixel horizontal pitch. In the case of the multi-view scheme, the horizontal pitch of the elemental images is equal to an integer multiple of the sub-pixel horizontal pitch, and the horizontal pitch of the beam control element is slightly smaller than an integer multiple of the sub-pixel horizontal pitch.

In the stereoscopic display apparatus, as shown in FIG. 13, a cylindrical lens array (lenticular sheet) 201 is arranged on the front surface of a flat panel type elemental image display such as a liquid crystal panel. As shown in FIG. 9, the elemental image display has sub-pixels 31 having an aspect ratio of 3:1 and arranged linearly in the lateral direction and the longitudinal direction to form a matrix. The sub-pixels 31 are arrayed so that red (R), green (G), and blue (B) alternate in the row direction and the column direction. This color arrangement is generally called a mosaic array. Assume that the opening shape of the sub-pixels is one of those shown in FIGS. 1 to 6. 9 columns×3 rows of sub-pixels 31 constitute one effective pixel 32 (indicated by a solid frame) in stereoscopic display. In this display structure, in stereoscopic display, one pixel comprises 27 sub-pixels. Assuming that one parallax requires three color components, stereoscopic image display that provides nine parallaxes in the horizontal direction is possible. The effective pixel refers to the minimal unit of sub-pixel groups that determines the resolution in stereoscopic display, and the elemental image refers to the set of parallax component images corresponding to one lens. Hence, in the case of a stereoscopic display apparatus that uses a cylindrical lens, one elemental image includes a large number of effective pixels lining up in the longitudinal direction.

With the above arrangement, in the stereoscopic display apparatus in which the beam control element is set vertically, moiré which interferes with display does not occur. The continuity of motion parallax improves, and the overall image quality of stereoscopic image improves.

The present invention is not limited to the above embodiments. When practicing the invention, the present invention can be implemented by modifying the constituent elements without departing from the spirit and scope of the invention.

Appropriate combinations of the constituent elements disclosed in the above embodiments can constitute various types of inventions. For example, several ones may be omitted from the entire constituent elements shown in the embodiments. Furthermore, constituent elements according to different embodiments may be combined appropriately.

What is claimed is:
1. A stereoscopic display apparatus comprising:
  a display including pixels arrayed in a longitudinal direction and a lateral direction in a matrix shape, each of the pixels comprising sub-pixels with color components, openings of any two adjacent sub-pixels in the lateral direction always overlapping regardless of a position in the lateral direction, and the sum of longitudinal components of opening ratios being constant; and a control element opposed to the display, including optical openings extending linearly in the longitudinal direction and arrayed in the lateral direction, for controlling beams from the sub-pixels, wherein when an aspect ratio of a shape of the sub-pixels satisfies lateral : longitudinal=1:N, a longitudinal wiring line between the openings of two sub-pixels adjacent in a right-and-left direction comprises M substantially straight lines (M>=1) forming an angle $\theta$ with a vertical direction that satisfies $\theta$> arctan (M/N).

2. The apparatus according to claim 1, wherein a color arrangement of the sub-pixels with color components comprises a mosaic array.

3. The apparatus according to claim 1, wherein a color arrangement of the sub-pixels with color components comprises a lateral stripe array.

4. The apparatus according to claim 1, wherein the longitudinal components of the opening ratios changes in value monotonically with respect to the position in the lateral direction.

5. The apparatus according to claim 1, wherein the display includes light-shielding portions corresponding to longitudinal wiring lines and extending in a zigzag fashion in a column direction.

6. The apparatus according to claim 5, wherein the light-shielding portions extend in a zigzag fashion within each row.

7. The apparatus according to claim 6, wherein each of the openings of the sub-pixels comprises two segments separated at a central portion thereof.

8. The apparatus according to claim 1, wherein each vertex of each of the openings of the sub-pixels is located on the same vertical line as a vertex of an opening of a sub-pixel that is adjacent in the right-and-left direction, and each endmost vertex of each of the openings of the sub-pixels is located on the same vertical line as an endmost vertex of an opening of a sub-pixel that is apart by one sub-pixel in the right-and-left direction.

* * * * *